Jan. 23, 1962   F. E. BURNELL   3,017,692
OPERATING TOOL FOR SPRING CLIP
Filed Aug. 31, 1959   2 Sheets-Sheet 1

INVENTOR.
FLOYD E. BURNELL
BY Pyle & Fisher
ATTORNEYS

*INVENTOR.*
FLOYD E. BURNELL
BY *Pyle & Fisher*
ATTORNEYS

United States Patent Office
3,017,692
Patented Jan. 23, 1962

3,017,692
OPERATING TOOL FOR SPRING CLIP
Floyd Edward Burnell, Frankfort, N.Y., assignor to
Kelsey-Hayes Company
Filed Aug. 31, 1959, Ser. No. 837,209
2 Claims. (Cl. 29—229)

This invention relates to plier devices and more particularly to devices suited to expand split cylinder type clips.

Certain split cylindrically shaped clips are designed to be fitted over cylindrical pins or posts. These clips are of varying size. The general principle upon which these clips function is that of spring compression force. That is, when the diameter of a split clip is expanded a resulting spring force urges the clip back to its normal diameter. While the clip is in its expanded state, it is placed over a pin or post having a larger diameter than the diameter of the clip in its normal state and a smaller diameter than the diameter of the clip in its expanded state. The force holding the clip in the expanded state is released after the clip has been positioned over the pin or post. The resulting spring closing action, or force, inherent in the clip, urges it back toward its normal closed diameter snugly securing the clip to the post or pin. The clip cannot return to its normal closed diameter since the post has a greater diameter than that of the clip in its normal closed position. It is often desirable to place and remove a clip several times over a period of time so it is necessary that any tool used to place or remove the clip must be designed so that the clip will not be permanently deformed when replaced or removed. But the tool must securely grip the clip without interfering in the placement of the clip.

Therefore, one of the principal objects of this invention is to provide a tool suited to place and remove split cylinder type clips.

A related object of this invention is to provide a tool that will not permanently deform a split cylinder type clip when the clip is placed on or removed from a pin or post by use of the tool.

Still a further object of this invention is to provide a tool that will grip a split cylinder type clip securely and expand the clip so that it may be snugly seated against a restraining surface at one end of a pin or post.

Still a further object of this invention is to provide a tool that will expand the inside diameter of a split cylinder type clip without blocking the passage in the clip.

Still a further object of this invention is to construct a tool in accordance with the foregoing objects and specifications.

Other objects and a fuller understanding of the invention may be had by referring to the following description and claims taken in conjunction with the accompanying drawings, in which:

Figure 1:
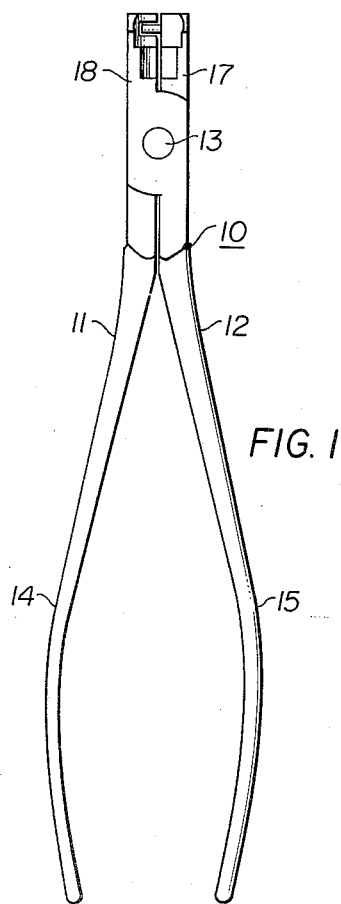
FIGURE 1 is a side elevational view of the preferred embodiment of the tool.
Figure 2:
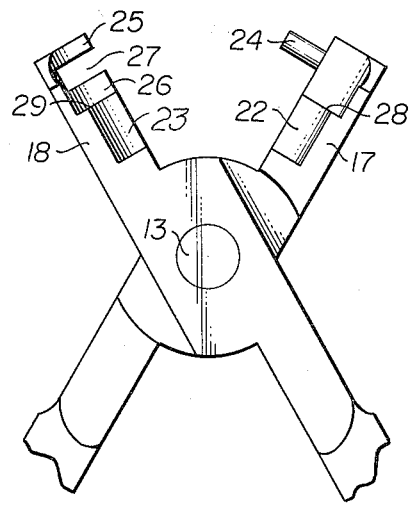
FIGURE 2 is an enlarged view of the jaw portion of the device of FIGURE 1 in an open position.
Figure 3:
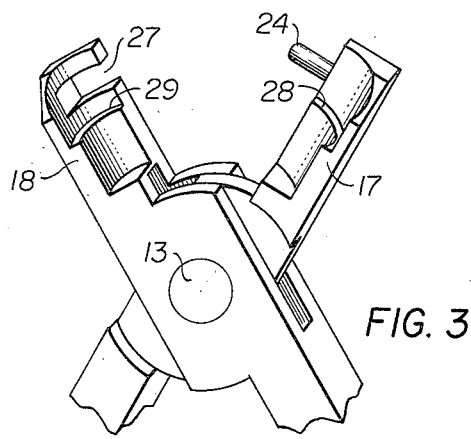
FIGURE 3 is a perspective view of the same jaw portion shown in FIGURE 2.

Referring to the drawings, a tool 10 is shown which has a pair of levers 11, 12 swingable about a pivot pin 13. Lever 11 has a handle portion 14 and the lever 12 a handle portion 15. The lever 11 has a jaw portion 17 and lever 12 a jaw portion 18. The jaws are mated. The device can swing between an open position in which the jaws are relatively spread and a closed position wherein the jaws are in abutment with each other. The jaw portions 17, 18 have jaw segments 22, 23 respectively, which have arcuate configurations, and when the device is in the closed position, the two arcuate shaped segments 22, 23 form a portion of a cylindrical wall. The diameter of this cylindrical wall is the desired expanded diameter for the clip.

The jaw 17 has a projection 24 extending therefrom in the direction of the other jaw 18. In the preferred embodiment, this projection 24 is in the form of a round pin. The opposite jaw 18 has two back-up surfaces 25 and 26 which define a receiving aperture 27 for the projection 24. When the tool 10 is in the open position, the projection 24 is spaced from the projection receiving aperture 27 along an arcuate path. When the device is in the closed position, the projection 24 is positioned in the receiving aperture 27. The jaws 17 and 18 have abutments 28, and 29 respectively, which are in the form of shoulders in the preferred embodiment. These shoulders 28 and 29 are normal to the arcuate segments 22 and 23.

Figure 4:
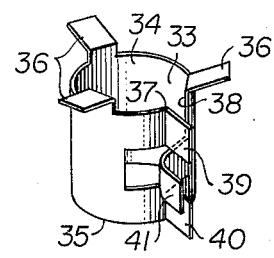
FIGURE 4 is a perspective view of the clip device to be operated by the tool.
Figure 5:
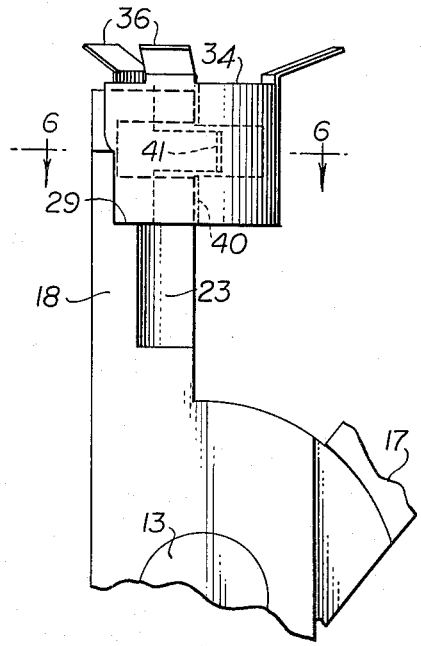
FIGURE 5 is an enlarged fragmentary view of the tool of FIGURE 1 showing one jaw only, with a clip positioned in operative position preparatory to opening of the clip.
Figure 6:
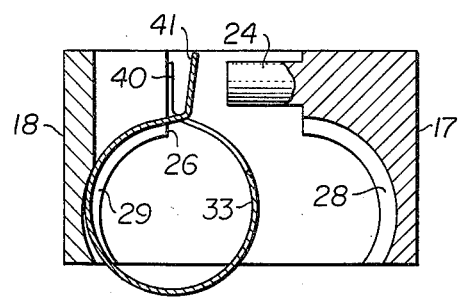
FIGURE 6 is a section taken along line 6—6 of FIGURE 5, showing both jaws and in an open position.
Figure 7:
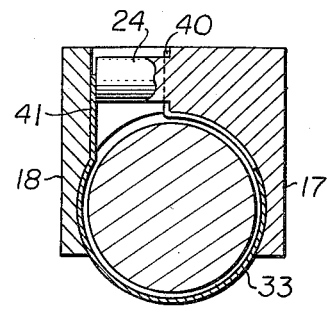
FIGURE 7 is a section taken in the same position as FIGURE 6, but with the jaws closed to spring the clip apart, and with a section of a post positioned in the clip to illustrate the clearance relationship with respect thereto.

This tool 10 has been especially designed to place and remove split cylinder type clips such as are presently made by Tinnerman Co. and known as Tinnerman clips. These clips, see FIGURE 4, have a split cylinder body 33. One end 34 of the body 33 which has a semi-circular shape has three prongs 36 radiating therefrom. The opposite end 35 of the body 33 is smooth, having a semi-circular shape. There are two edges 37 and 38 of the body 33 parallel to the axis of the body. From one edge 37 a pair of spaced ears 39 and 40 extend laterally from the circumference of body 33. From the opposite edge 38 a single ear 41 extends laterally from the body 33. The single ear 41 is located between the pair of ears 39 and 40. The clip is suited to be placed over a post or pin shown in cross section in FIGURE 7, and the prongs 36 are provided to abut a surface at the base of the pin or post.

The function of the tool 10 can best be understood by relating its action with a clip and demonstrating how the tool places and removes clips. The tool is positioned in its open position. A clip is placed in jaw 18 having the aperture 27 such that a portion of the clip's body 33 is in contact with the arcuate segment 23 and each one of the pair of ears 39 and 40 is against one of the back-up surfaces 25 and 26. A portion of the clip's smooth end 35 is placed against the shoulder 29. The plier device is then moved toward the closed position. As the device is moving toward this closed position, the projection 24 engages the clip's single ear 41. The pair of ears 39 and 40 are restrained from moving by the back-up surfaces 25 and 26 and the body 33 is restrained from lateral movement by the arcuate segment 23. The single ear 41 transmits a force to the body 33 in a tangential direction; this force acts to expand the internal diameter of the body 33. As the closing movement continues, the force is being constantly applied so that the diameter increases until the closing movement ceases, either because of the operator so determining, or by the abutment of the jaws. At a full closed position, both the single ear 41 and the projection 24 are positioned in the aperture 27.

As the clip is expanded, the smooth end 35 enlarges in diameter until it lies in full contact with the shoulders 28 and 29. Thus, after the clip is expanded, it is orientated to slip over the receiving post and is forced home. The contact of end 35 with the shoulders 28 and 29 will permit any necessary force in an axial direction to place the clip without danger of dislodging the clip from the tool, and will assure full seating of the expanded clip before its release to spring down upon the post in a clamping condition.

Since the closing movement strains the clip less than the elastic limit, when the stress is removed the resultant action will be a force tangential to the body in a direction opposite that of the externally applied force and the result will be a contracting of the internal diameter of the body of the clip. While the clip is in the expanded state, it may be placed over a pin or post of a diameter less than the expanded diameter and when the pressure is released then the inside diameter will decrease toward its diameter in the unstressed state and if the post or pin has a diameter larger than the diameter of the clip in its unstressed condition, the post will arrest the contraction and the closing forces exerted by the clip will hold it snugly to the post or pin.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A plier device adapted to expand a split cylindrically shaped clip, the clip having a pair of spaced ears projecting on one side of said split, said clip having a single ear projecting from the other side of said split, and positioned between the pair of ears, said plier device having first and second levers, pivot means joining said levers, each of said levers having a handle portion, said first and second levers having respectively first and second mated jaw portions, said device having an open position wherein said jaw portions are relatively widely spaced and a closed position wherein said jaw portions are relatively closely spaced, each of said jaw portions having a wall having an arcuate configuration, said walls defining a containment housing when in said closed position, each of said walls having a semi-circular shape, said first jaw portion having a projection projecting therefrom toward said second jaw portion said projection terminating at a flat end substantially normal to the axis of the projection, said second jaw portion having a receiving aperture, said aperture being shaped and positioned to receive said projection, said second jaw portion having a pair of backup surfaces on opposite sides of said aperture, said aperture terminating at a flat back wall substantially parallel to the end of said projection when the device is in the closed position, said back wall lying wholly on one side of a plane tangential to the arcuate surface of the second jaw and parallel with said back up surfaces, each of said jaw portions having a shoulder formed therein concentric with said arcuate configuration, and normal to the arcuate segments, said jaw portions being relatively swingable around the said pivot means, in said open position said projection being in spaced relationship with respect to said aperture, in said closed position said projection being positioned in said aperture, whereby the clip may be gripped by said jaw portions when in said open position and the inside diameter of said clip be expanded as said device is moved to said closed position.

2. In the device of claim 1, said back wall being positioned between said tangential plane and said back up surfaces, and being parallel thereto.

References Cited in the file of this patent
UNITED STATES PATENTS

| | | |
|---|---|---|
| 2,562,128 | Sawdy | July 24, 1951 |
| 2,814,963 | Harrington | Dec. 3, 1957 |